Aug. 24, 1943.  G. W. FERNSTRÖM  2,327,880

AXIAL BALL OR ROLLER BEARING

Filed Oct. 16, 1940

INVENTOR

Gustav Wallentin Fernström

BY

HIS ATTORNEY

Patented Aug. 24, 1943

2,327,880

UNITED STATES PATENT OFFICE 2,327,880

AXIAL BALL OR ROLLER BEARINGS

Gustav Wallentin Fernström, Gothenburg, Sweden, assignor to Aktiebolaget Svenska Kullagerfabriken, Goteborg, Sweden, a corporation of Sweden Application October 16, 1940, Serial No. 361,378
In Sweden December 15, 1939

4 Claims. (Cl. 308—231)

The present invention relates to an improvement in axial ball or roller bearings having two rings located axially beside one another and a number of rolling bodies placed between the rings and spaced apart by a ball- or roller cage. An object of the invention is to retain the ball or roller set to one of the bearing rings by means of the ball or roller cage, so that the bearing ring, the cage and the ball or roller set can be handled as a unit. Another object of the invention is to provide a suitable arrangement for centering the cage in relation to the bearing rings. A further object is to give the different parts of the bearing such a shape that they become simpler and cheaper to manufacture. The invention is therefore characterized substantially thereby that the cage is movably connected with one of the bearing rings by means of a flanged sleeve, or the like, located axially beside one of the bearing rings and connected with the same, and that the parts of the cage between the rolling bodies are arranged to embrace at least partly the rolling bodies, the whole arrangement thus being such that the bearing ring with its sleeve, the cage and the rolling bodies will be movably connected with each other so as to form a unit.

An embodiment of the invention is shown in the accompanying drawing in which

Figure 1:
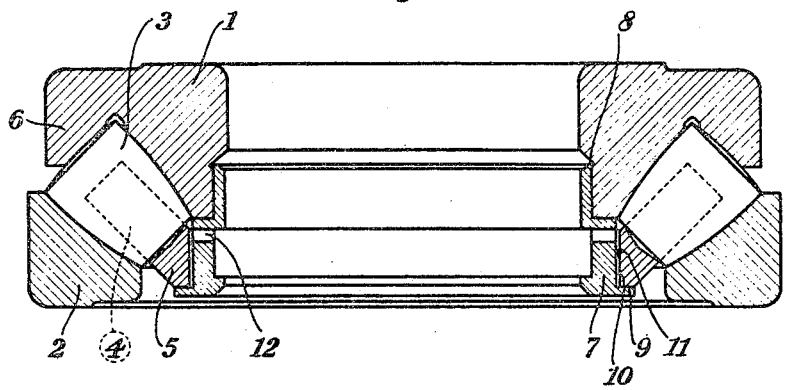
Fig. 1 shows an axial section through a roller bearing according to the invention.
Figure 2:
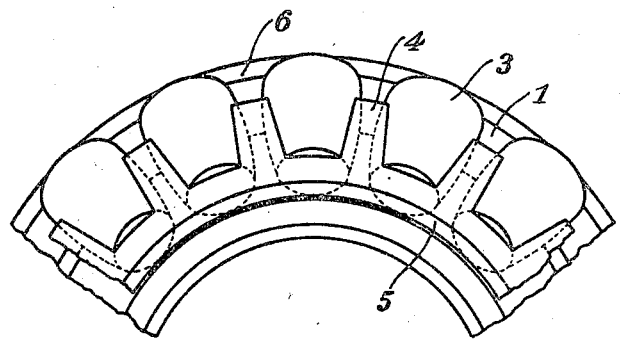
Fig. 2 is a fragment of a horizontal projection of one of the bearing rings with the roller set and the roller cage, the other bearing ring and the connecting sleeve being supposed to be removed.

In the embodiment shown 1 designates one of the rings of a self-aligning axial roller bearing and 2 another roller bearing ring arranged axially beside the first-mentioned ring. Between the bearing rings a number of rollers 3 are placed, which latter are separated from each other by means of tongues 4 on the roller cage 5. The rollers are guided in such a manner that their big ends abut against a flange 6, which in the embodiment shown is provided with a spherical guiding surface of such a height that it covers the greater part of the end surface of the rollers.

Figures 3, 4:
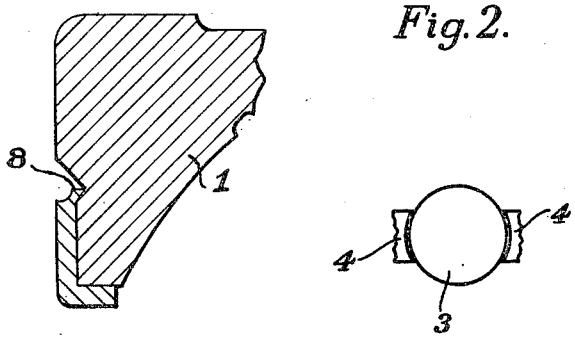
Fig. 3 is an end view of a roller and parts of the cage tongues coacting therewith.
Figure 4 is an enlarged fragmentary sectional view illustrating a detail of construction.

In an enlargement of the bore of the bearing ring 1 a sleeve 7 is provided, preferably with press fit. The connection between the ring 1 and the sleeve 7 is further secured thereby that one edge of the sleeve 7 is rolled into a groove 8 in the bearing ring 1. The groove 8 and the manner in which the edge of the sleeve 7 engages therein is best shown in Figure 4. At its other end the sleeve 7 is provided with a flange 9, and the sleeve 7 has further a cylindrical portion 10 of a suitable diameter so that it has a loose fit in the inner cylindrical surface 11 of the cage 5. The flange 9 has a greater outer diameter than the inner diameter of the cage 5. It is therefore immediately obvious that since the sleeve 7 has been placed in its position and secured in the bearing ring 1, the cage 5 will be movably connected with the bearing ring.

The tongues 4 are executed with curved contact faces against the rollers 3, whereby the rollers are allowed to move somewhat in their radial direction but are prevented from entirely departing from the roller pockets otherwise than by an axial displacement out of the roller pocket. In an assembled bearing such a movement is however prevented by the flange 6. The assembly of the bearing is performed in such a manner that the rollers 3 are inserted in their pockets in the cage, whereupon the bearing ring 1 is placed in position, the sleeve 7 is introduced in the bearing ring 1 and the edge is rolled down in the groove 8. Through this operation the flange 9 prevents the removal or falling out of the cage 5, which latter is its turn in cooperation with the flange on the bearing ring 1 prevents the falling out of the rollers. The bearing ring 1, the sleeve 7, the cage 5 and the rollers 3 are in this manner assembled as a manageable unit, whereby the mutual movability of the ring, the cage and the rollers is still maintained.

The sleeve 7 thus serving to keep the bearing parts together has simultaneously the function to act as a support for the cage 5. When the bearing is mounted in a machine with vertical shaft, the cage is held against the flange 9, as shown in Fig. 1, and in the case of a horizontal shaft the cylindrical surface 10 on the sleeve 7 can support and center the cage 5. A number of lubricant holes 12 are provided in the sleeve 7 for the introduction of lubricant, partly for lubricating the contact surfaces between the cage 5 and the sleeve 7 and partly for lubricating the bearing proper. The sleeve can also function as a distance ring when two bearings are mounted together in a bearing arrangement.

The invention is of course not restricted to the form of embodiment shown, but other forms of embodiment may also be imagined as falling within the scope of the principle of the invention. Thus the invention can for instance be applied to ball bearings, and a cage can be made in such a manner that it in itself retains the rolling bodies without the aid of a flange on the bearing ring.

I claim:

1. A thrust anti-friction bearing comprising a pair of bearing rings and a set of rolling bodies interposed between the said bearing rings, one of the said bearing rings having a flange at its outer periphery, a sleeve extending into and secured within the bore of the said flanged bearing ring and extending axially toward the other bearing ring, there being a radially extending flange at the end of the said extension, a cage having a substantially cylindrical bore journaled on said sleeve and a substantially plane surface bearing against the flange of the said sleeve, the said cage having tongues projecting between and partially embracing the rolling bodies so as to retain the latter, the flanged ring, the sleeve, the set of rolling bodies and the cage being interconnected to form a separate handling unit independent of the other bearing ring.

2. A thrust roller bearing comprising a pair of bearing rings and a set of rollers interposed between the said rings, one of the said bearing rings having a flange at its outer periphery, the said flange extending past the axes of the rollers, a sleeve extending into and secured within the bore of the said flanged bearing ring and extending axially toward the other bearing ring, there being a radially extending flange at the end of the said extension, a cage having a substantially cylindrical bore journaled on said sleeve and a substantially plane surface bearing against the flange of the said sleeve, the said cage having tongues projecting between and partially embracing the rollers so as to retain the latter, the flanged ring, the sleeve, the set of rollers and the cage being interconnected to form a separate handling unit independent of the other bearing ring.

3. A thrust anti-friction bearing comprising a pair of bearing rings and a set of rolling bodies interposed between the said bearing rings, one of the said bearing rings having a flange at its outer periphery, a sleeve extending into and secured within the bore of the said flanged bearing ring and extending axially toward the other bearing ring, there being a radially extending flange at the end of the said extension, a cage having a substantially cylindrical bore journaled on said sleeve, the said sleeve having a circumferential groove in the bore thereof opposite to the cage and a lubricant passage connecting the groove and the outer periphery of the sleeve, the said cage having tongues projecting between and partially embracing the rolling bodies so as to retain the latter, the flanged ring, the sleeve, the set of rolling bodies, and the cage being interconnected to form a separate handling unit independent of the outer bearing ring.

4. A thrust antifriction bearing comprising a pair of bearing rings and a set of rolling bodies interposed between the said bearing rings, one of the said bearing rings having a flange at its outer periphery and an enlargement in the bore thereof, there being a peripheral groove in the bore at the end of said enlargement, a sleeve in the said enlargement and having its end rolled into said groove, said sleeve extending axially toward the other bearing ring, there being a radially extending flange at the end of the said extension, a cage having a substantially cylindrical bore journaled on said sleeve and a substantially plane surface bearing against the flange of the said sleeve, the said cage having tongues projecting between and partially embracing the rolling bodies so as to retain the latter, the flanged ring, the sleeve, the set of rolling bodies and the cage being interconnected to form a separate handling unit independent of the other bearing ring.

GUSTAV WALLENTIN FERNSTRÖM.